US012209663B2

(12) United States Patent
Yang et al.

(10) Patent No.: US 12,209,663 B2
(45) Date of Patent: Jan. 28, 2025

(54) SEALING MEMBER WITH LIP SEAL

(71) Applicant: Applied Materials, Inc., Santa Clara, CA (US)

(72) Inventors: Yao-Hung Yang, Santa Clara, CA (US); Chih-Yang Chang, Cupertino, CA (US); Sam Hyungsam Kim, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/215,604

(22) Filed: Jun. 28, 2023

(65) Prior Publication Data

US 2024/0026975 A1 Jan. 25, 2024

Related U.S. Application Data

(60) Provisional application No. 63/391,836, filed on Jul. 25, 2022.

(51) Int. Cl.
| *F16J 15/06* | (2006.01) |
| *F16J 15/02* | (2006.01) |
| *F16J 15/10* | (2006.01) |

(52) U.S. Cl.
CPC ........... *F16J 15/062* (2013.01); *F16J 15/025* (2013.01); *F16J 15/102* (2013.01)

(58) Field of Classification Search
CPC ........ F16J 15/022; F16J 15/025; F16J 15/061; F16J 15/062
See application file for complete search history.

(56) References Cited

U.S. PATENT DOCUMENTS

| 5,482,297 A | 1/1996 | Burns et al. |
| 6,173,970 B1 | 1/2001 | Choudary et al. |
| 6,264,206 B1 * | 7/2001 | Hashizawa ............ F16J 15/062 |
| | | 277/648 |
| 6,523,833 B1 | 2/2003 | Ishigaki et al. |
| 7,007,954 B2 * | 3/2006 | Travers .................. F16J 15/025 |
| | | 277/626 |
| 8,181,972 B2 * | 5/2012 | Tsuji ....................... F16K 51/02 |
| | | 277/644 |
| 8,414,705 B2 | 4/2013 | Nakagawa |
| 9,349,621 B2 | 5/2016 | Singh |
| 11,359,722 B2 | 6/2022 | Maheshwari et al. |

(Continued)

FOREIGN PATENT DOCUMENTS

| JP | 2000356267 A | 12/2000 |
| JP | 2004176834 A | 6/2004 |
| WO | 2010008787 A2 | 1/2010 |

OTHER PUBLICATIONS

International Search Report and Written Opinion dated Oct. 26, 2023 for Application No. PCT/US2023/026483.

(Continued)

*Primary Examiner* — Nicholas L Foster
(74) *Attorney, Agent, or Firm* — Patterson + Sheridan, LLP

(57) ABSTRACT

A sealing member includes a monolithic body including a first portion adjoining a second portion. The first portion forms part of a circle. The second portion includes first and second lobes. Each lobe adjoins the first portion with a concave surface. In one example, each lobe includes a rounded tip, and a convex surface extends from one rounded tip to the other rounded tip.

16 Claims, 9 Drawing Sheets

(56) References Cited

U.S. PATENT DOCUMENTS

| | | | |
|---|---|---|---|
| 2005/0001388 A1* | 1/2005 | Travers | F16J 15/025 |
| | | | 277/644 |
| 2006/0220326 A1* | 10/2006 | Leadley-Brown | F16J 15/062 |
| | | | 277/609 |
| 2008/0191474 A1 | 8/2008 | Kotz | |
| 2011/0037228 A1 | 2/2011 | Thomas, Jr. et al. | |
| 2019/0242480 A1 | 8/2019 | Nakagawa et al. | |
| 2020/0025292 A1 | 1/2020 | Maheshwari et al. | |
| 2020/0043769 A1 | 2/2020 | Bonecutter | |
| 2021/0033193 A1* | 2/2021 | Aoki | F16J 15/062 |

OTHER PUBLICATIONS dupont.com—Kalrez® TriLobe™ Seals _ Dove-Tail Groove Configurations; (https://www.dupont.com/knowledge/kalrez-trilobe-seals.html).
gallagherseals.com—Spring Energized—Face Seals—Categories; (https://www.gallagherseals.com/categories/face-seals/spring-energized.html).
herculesus.com—MUUL-70X80X6—Hercules for o-rings, hydraulic seals, cylinders; (https://herculesus.com/product.php?productcode=MUUL-70X80X6&pd=Y&cat=15721&pid=15888).
PAI X-Ring and Multiseal brochure.

* cited by examiner

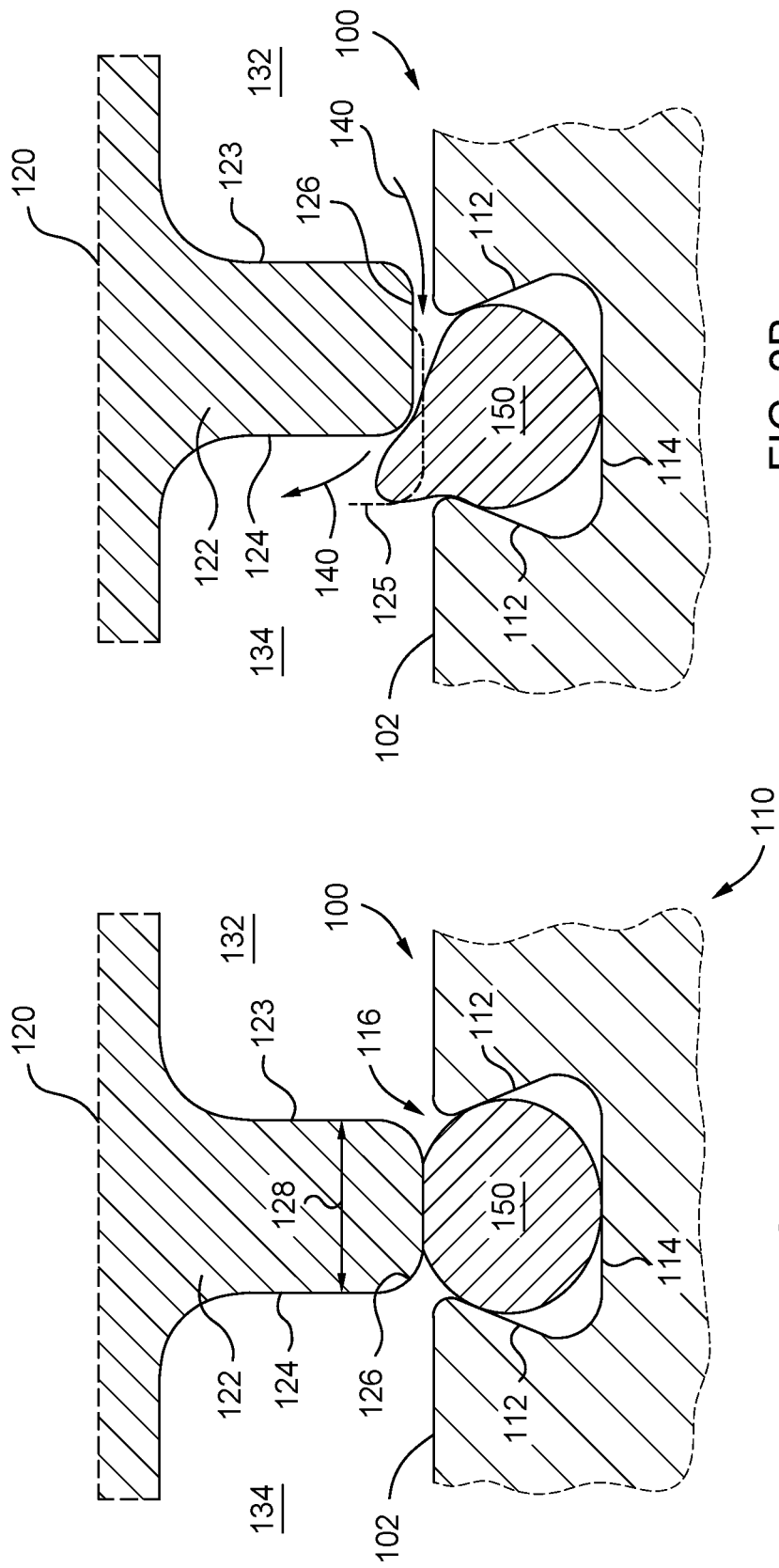

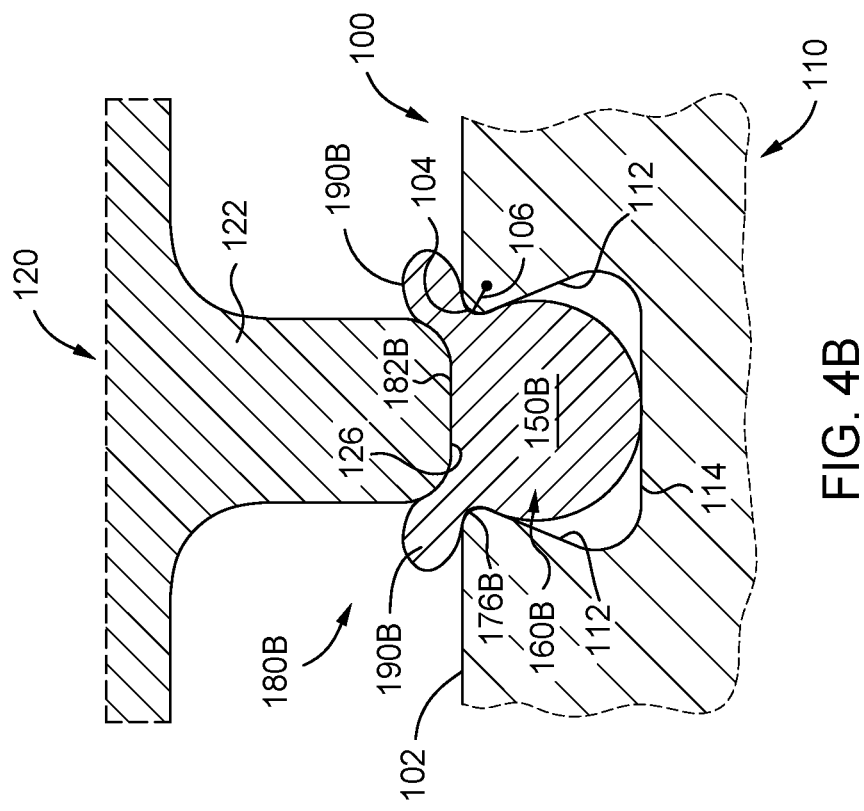
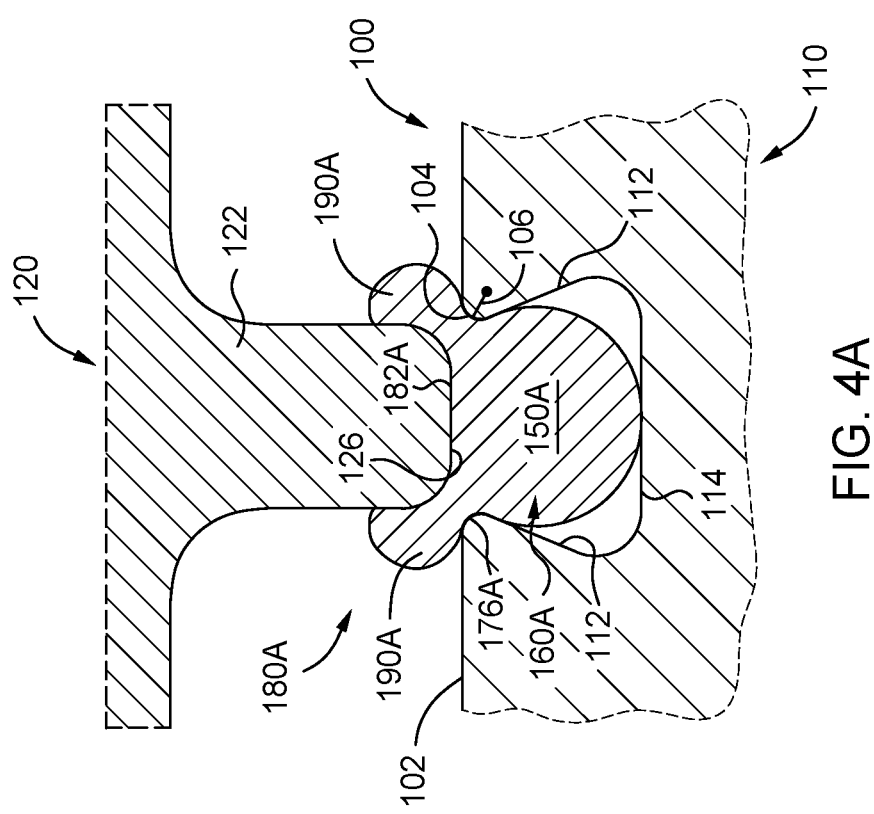

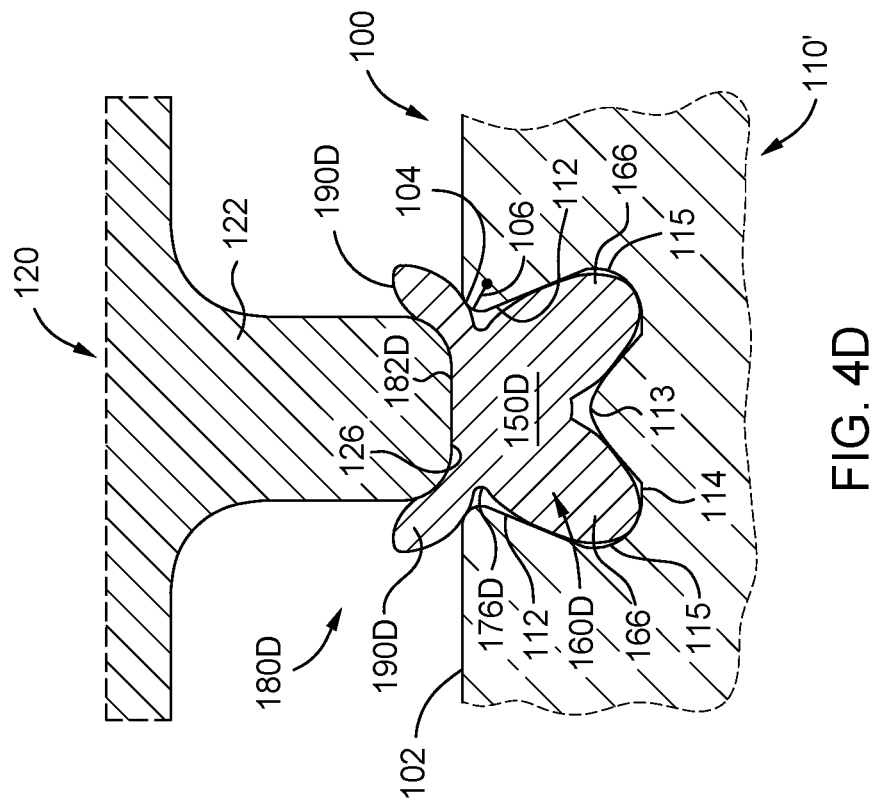
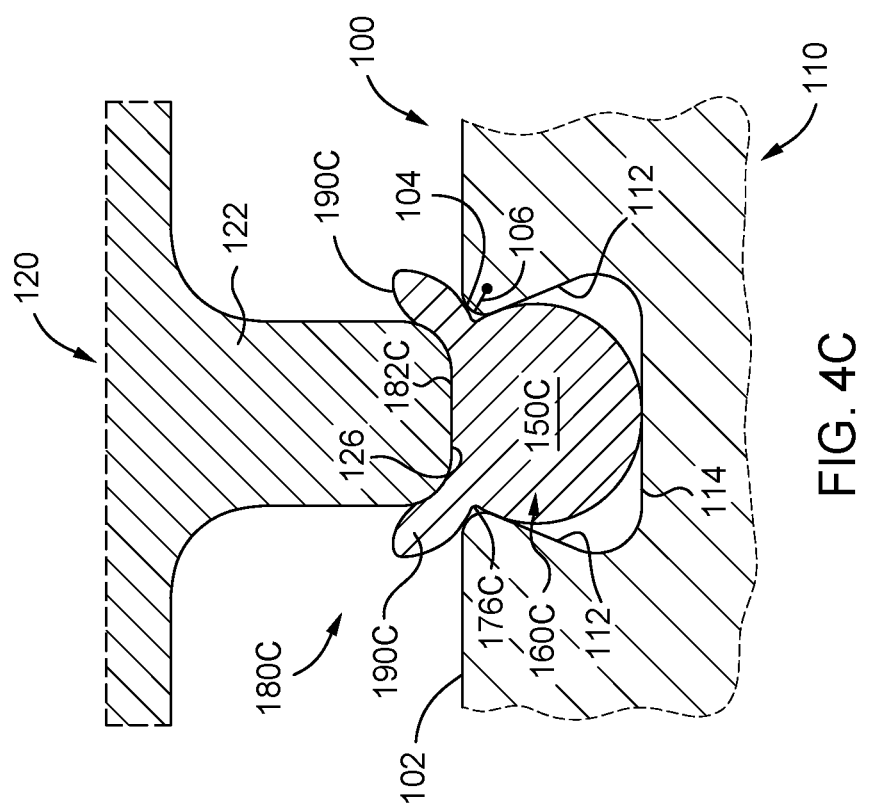

SEALING MEMBER WITH LIP SEAL

CROSS-REFERENCE TO RELATED APPLICATIONS

This application claims benefit of U.S. Provisional application No. 63/391,836, filed Jul. 25, 2022, which is incorporated herein by reference in its entirety.

BACKGROUND

Field

Embodiments of the present disclosure generally relate to a sealing member, such as an o-ring and the like, that is installed in a seal groove formed in a face of a component.

Description of the Related Art

In some equipment, such as that used for electronic chip manufacture, a face of one component is required to sealingly engage a face of another component. Typically, a sealing member, such as an o-ring, installed in a seal groove formed in a face of one of the components may be several feet long, and may follow an intricate pathway, such as a spiral-shaped pathway. In some applications, component geometries and manufacturing tolerances necessitate the seal groove and sealing member to be relatively thin, which can result in the sealing member leaking at one or more discrete locations along a length of the sealing member.

Thus, there is a need for an improved sealing member.

SUMMARY

The present disclosure generally relates to a sealing member, such as an o-ring and the like, that is installed in a seal groove formed in a face of a component. In one embodiment, a sealing member includes an elongated monolithic body including a first portion adjoining a second portion. When viewed in a coronal plane perpendicular to a direction of elongation, the first portion forms part of a circle. Additionally, the second portion includes: a first lobe including a first rounded tip, and adjoining the first portion with a first concave surface; a second lobe including a second rounded tip, and adjoining the first portion with a second concave surface; and a convex surface extending from the first rounded tip to the second rounded tip.

In another embodiment, a sealing member includes an elongated monolithic body including a first portion adjoining a second portion. When viewed in a coronal plane perpendicular to a direction of elongation, the first portion includes first and second elliptical nodes. Each node includes a first major axis and a first minor axis, and extends away from the second portion along the major axis. Additionally, the second portion includes first and second elliptical lobes. Each lobe includes a second major axis and a second minor axis, and extends away from the first portion along the major axis. A thickness of each node measured along the first minor axis is greater than a thickness of each lobe measured along the second minor axis.

In another embodiment, an assembly includes a first component including a face with a seal groove therein, a sealing member in the seal groove, and a second component mounted to the first component, and including a ridge. The seal groove includes an opening with a first width, and the ridge includes an end with a second width less than the first width. The sealing member includes a monolithic body elongated in a direction along the seal groove, and including: a first portion located in the seal groove; and an adjoining second portion protruding out of the seal groove opening and contacting the end of the ridge. The second portion includes first and second lobes. Each lobe contacts the face of the first component at the opening of the seal groove.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

FIG. 2A schematically illustrates a portion of the combined assembly of the component of FIG. 1A and a second component.

FIG. 2B schematically illustrates a variation of the portion of the combined assembly of FIG. 2A.

FIGS. 4A-4D schematically illustrate the sealing members of FIGS. 3A-3D, respectively, installed in the assembly of FIG. 2A.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure concerns a sealing member, such as an o-ring and the like, configured for use in a seal groove, such as a seal groove in a face of a component. It is contemplated that the sealing member may be made from any suitable sealing material, such as an elastomer, a thermoplastic, or a metal.

Figure 1A:
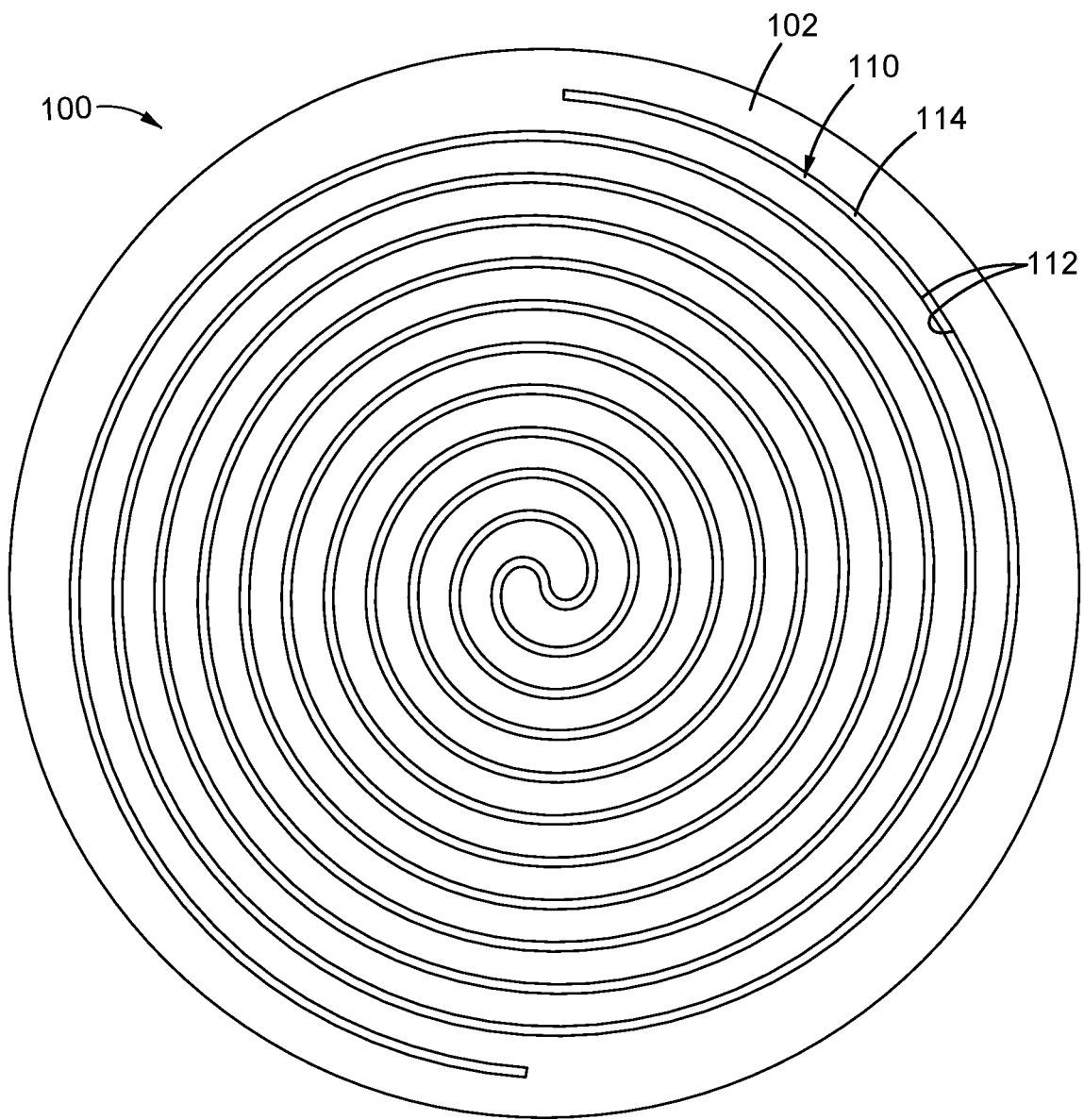
FIG. 1A is a schematic front view of a component into which a sealing member is to be installed.

FIG. 1A is a schematic front view of a first component 100 into which a sealing member is to be installed. Some examples of first component 100 include, without limitation, parts of a semiconductor processing chamber, such as a lid of a chamber, a part of gas distribution system, part of a substrate support, or a part of a heat transfer system, such as a part of a cooling circuit. Other examples include equipment associated with fluid distribution and/or heat transfer in other industries, such as in machinery for manufacturing, food processing, chemical processing, and the like. A face 102 of the first component 100 is configured to abut against, or otherwise mate with, a second component (not shown in FIG. 1A).

The face 102 includes a seal groove 110 that is configured to receive a sealing member. The seal groove 110 includes sidewalls 112 and a floor 114. The seal groove 110 is sized and shaped to receive the sealing member to provide a seal in a desired location between the component 100 and the other component when joined together.

In some embodiments, it is contemplated that the seal groove 110 defines a pathway around an outer periphery of the face 102 of the first component 100 only. In some embodiments, it is contemplated that the seal groove 110 defines a pathway around a portion of the face 102 of the first component 100 where a seal with the other component is desirable. In some embodiments, it is contemplated that the face 102 of the first component 100 includes a second seal groove. In some embodiments, it is contemplated that the second seal groove does not intersect with the seal groove 110. As illustrated, in some embodiments, the seal groove 110 is arranged as a spiral pathway.

Figure 1B:
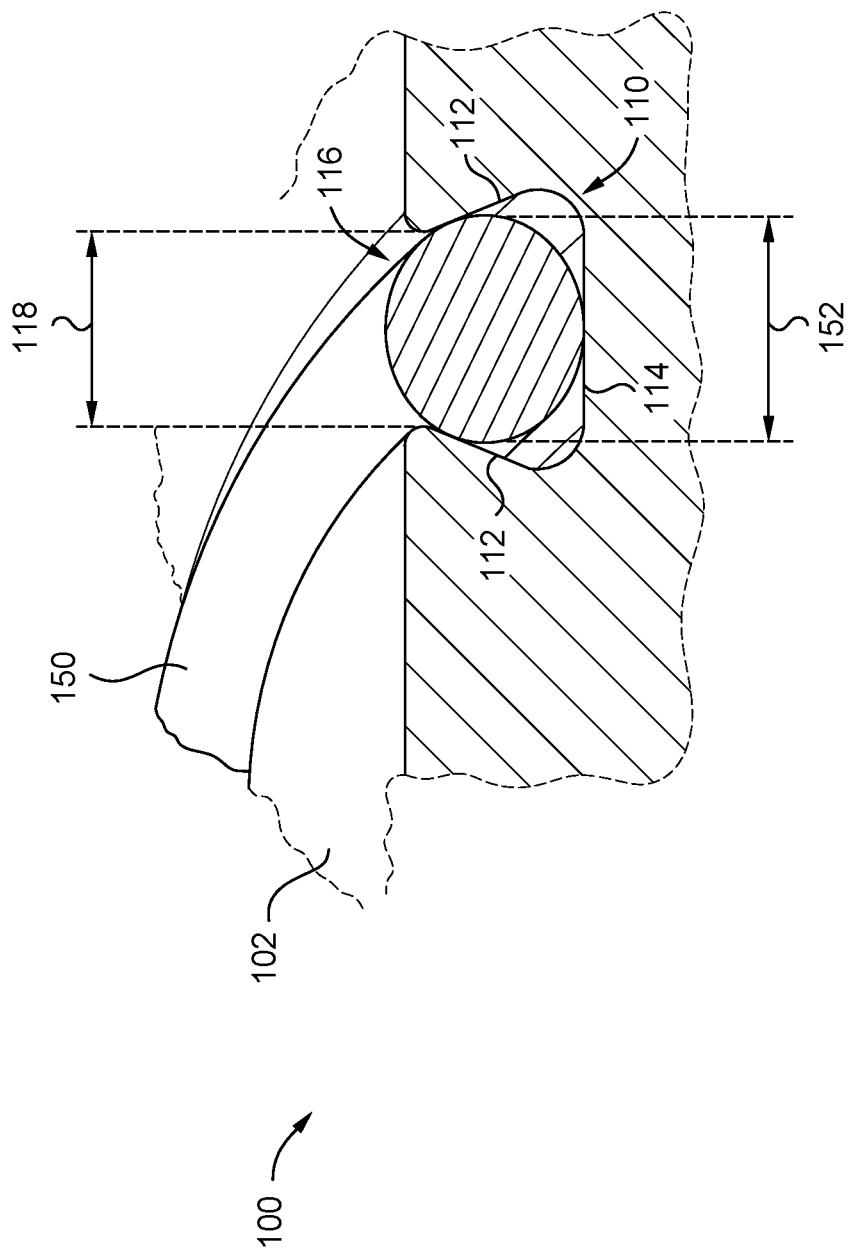
FIG. 1B schematically depicts a portion of the component of FIG. 1A in a combined isometric and cross-sectional view.

FIG. 1B schematically depicts a portion of the first component 100 in a combined isometric and cross-sectional view. A sealing member 150 is installed in, and extends along, the seal groove 110. The sealing member 150 is an elongated member such that a length of the seal member 150 is much greater than a sectional dimension of the seal member 150. The cross-sectional view is in a coronal plane which is perpendicular to the seal groove 110, and thus also is perpendicular to a direction of elongation of the sealing member 150. The seal groove 110 is depicted as a dovetail, however in some embodiments, the seal groove 110 may take a different cross-sectional shape, such as a half dovetail, rectangular, lobed, or other shape.

In some embodiments, the sealing member 150 makes sealing contact with at least one of the sidewalls 112 of the seal groove 110. In some embodiments, the sealing member makes sealing contact with the floor 114 of the seal groove 110 alternatively or in addition to making contact with one or more of the sidewalls 112 of the seal groove 110. A portion of the sealing member 150 protrudes through the opening 116 of the seal groove 110, allowing the sealing member 150 to be compressed when the first component 100 is abutted against another component. In some embodiments, such abutment of the seal against the other component forms a seal therebetween.

A maximum width 152 of the sealing member 150 in the coronal plane is measured parallel to the face 102 of the first component 100. As illustrated, in some embodiments, the maximum width 152 of the sealing member 150 within the seal groove 110 is greater than a width 118 of the opening 116 of the seal groove 110. In some embodiments, the maximum width 152 of the sealing member 150 within the seal groove 110 is less than the width 118 of the opening 116 of the seal groove 110. In some embodiments, the maximum width 152 of the sealing member 150 within the seal groove 110 is equal to the width 118 of the opening 116 of the seal groove 110.

In some embodiments, the sealing member 150 is formed as a closed annular member. In some embodiments, the sealing member 150 is not formed as a closed annular member. In some embodiments, the sealing member 150 is formed as a monolithic body. In some embodiments, the monolithic body is made of a metal, such as a stainless steel. In some embodiments, the monolithic body is made of an elastic material, such as an elastomer. In some embodiments, the monolithic body is made of a plasma-resistant material, such as a plasma-resistant elastomer. Some non-limiting examples of an elastic plasma-resistant material include fluorine rubber perfluoroelastomer and unfilled perfluoroelastomer, among others.

FIG. 2A is a cross-sectional view in the coronal plane that schematically illustrates the first component 100 mounted to a second component 120. FIG. 2A depicts a portion of the assembled first and second components 100, 120. The second component 120 includes a ridge 122 that extends towards the seal groove 110. The ridge 122 is aligned with the seal groove 110. An end 126 of the ridge 122 makes sealing contact with the portion of the sealing member 150 protruding through the opening 116 of the seal groove 110. As illustrated, in some embodiments, a width 128 of the end 126 of the ridge 122 is less than the width 118 of the opening 116 of the seal groove 110. In some embodiments, the width 128 of the end 126 of the ridge 122 is greater than the width 118 of the opening 116 of the seal groove 110. In some embodiments, the width 128 of the end 126 of the ridge 122 is equal to the width 118 of the opening 116 of the seal groove 110. Sealing contact between the sealing member 150 and the end 126 of the ridge 122, and between the sealing member 150 and the seal groove 110, inhibits fluid communication between a first zone 132 on a first side 123 of the ridge 122 and a second zone 134 on an opposite second side 124 of the ridge 122.

FIG. 2B schematically illustrates the portion of the assembled first and second components 100, 120 of FIG. 2A, but with the ridge 122 of the second component 120 out of alignment with the seal groove 110. The ridge 122 is displaced from the position (represented as shadow line 125) shown in FIG. 2A. In some examples, the ridge 122 may be displaced due to manufacturing tolerances. In some examples, the ridge 122 may be displaced due to warping. In the example illustrated in FIG. 2B, the depicted portion of the ridge 122 is displaced laterally towards the first zone 132 and vertically away from the face 102 of the first component 100 compared to the position 125 of the ridge 122 in FIG. 2A.

In some embodiments, although the ridge 122 is displaced such that at least a portion of the ridge 122 is out of alignment with the seal groove 110, the sealing member 150 does make a sealing contact with the end 126 of the ridge 122. However, in some embodiments, such a sealing contact is ineffective compared to the sealing contact provided by the juxtaposition of the ridge 122 and the seal groove 110 shown in FIG. 2A. Such an ineffective sealing contact can arise from limitations in loading applied to the sealing member 150 by the end 126 of the ridge 122 due to the vertical displacement of the ridge 122 from the position 125 represented in FIG. 2A. Additionally, or alternatively, such an ineffective sealing contact can arise from limitations in contact area between the sealing member 150 and the end 126 of the ridge 122 due to the horizontal displacement of the ridge 122 from the position 125 represented in FIG. 2A.

In some embodiments, when the ridge 122 is displaced such that at least a portion of the ridge 122 is out of alignment with the seal groove 110, the sealing member 150 does not make a sealing contact with the end 126 of the ridge 122. In the example illustrated in FIG. 2B, when the first zone 132 is at a higher pressure than the second zone 134, leakage (indicated by arrows 140) can occur between the first and second zones 132, 134. The leakage can be detrimental to system performance, and potentially can be exacerbated by such leaks causing localized erosion of the ridge 122, such as at the end 126 of the ridge 122.

In some embodiments, an ineffective sealing contact can arise from limitations in loading applied to the sealing member 150 by the end 126 of the ridge 122 due to corrosion and/or erosion at the opening 116 and/or sidewalls 112 of the seal groove 110. For example, such corrosion and/or erosion can cause enlargement of the seal groove 110, and can provide additional space beyond the original dimensions of the seal groove 110 into which the sealing member 150 can be displaced.

FIGS. 3A-3D schematically illustrate exemplary cross-sectional shapes of sealing members 150A-150D, respectively, that may be used as sealing member 150. FIGS. 3A-3D are cross-sectional views in the coronal plane, described above. The cross-sectional shape of each sealing member 150A-150D is configured to mitigate the adverse effects described above of the scenario depicted in FIG. 2B. Each sealing member 150A-150D includes the aspects and attributes of sealing member 150, described above.

Figure 3A:
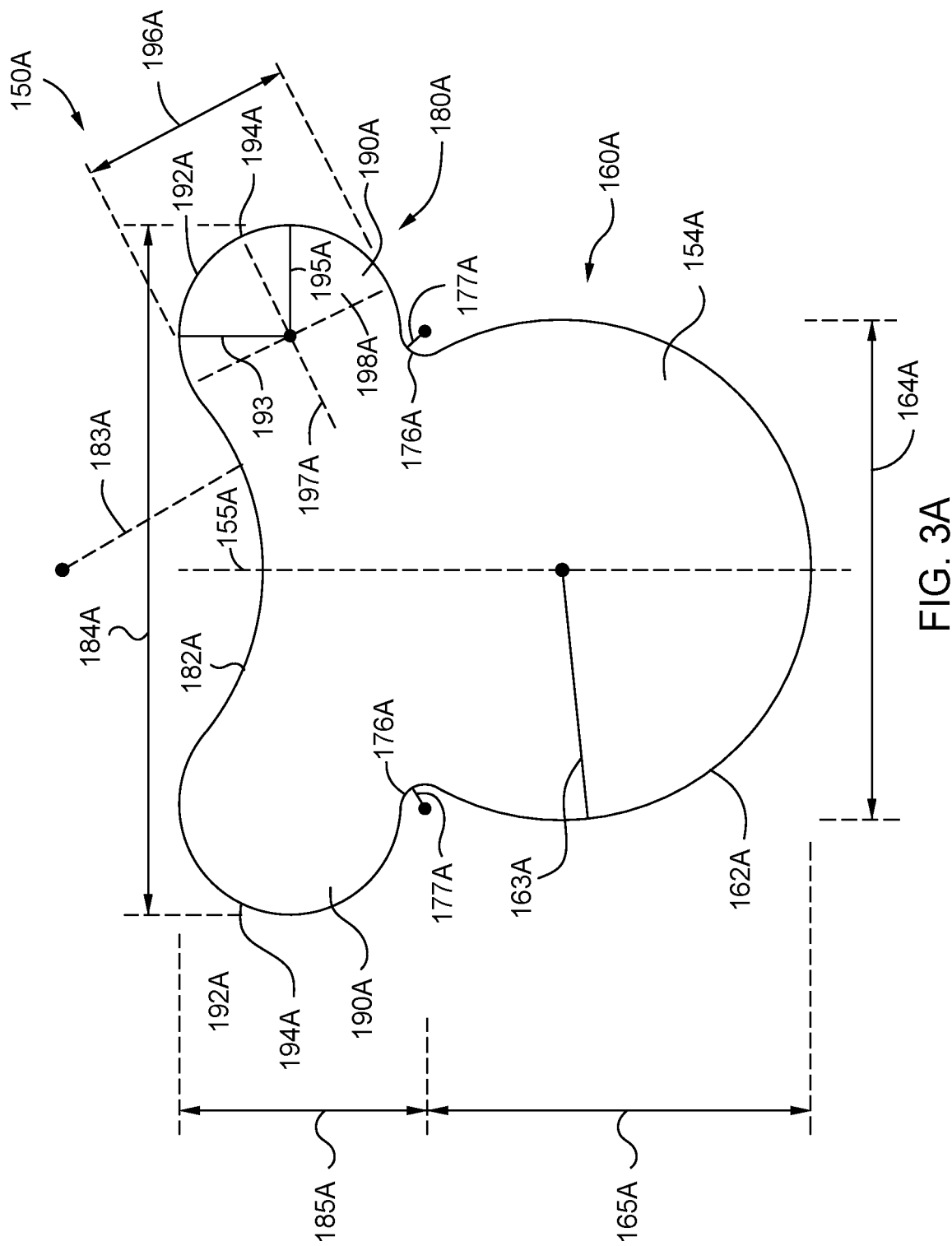
FIGS. 3A-3D schematically illustrate exemplary cross-sectional shapes of sealing members.

FIG. 3A illustrates sealing member 150A. The sealing member 150A includes a body 154A with a first portion 160A adjoining a second portion 180A. In some embodiments, the sealing member 150A is symmetrical about a center axis 155A passing through the first portion 160A and the second portion 180A. The first portion 160A includes a curved, convex surface 162A. As illustrated, in some embodiments, the convex surface 162A of the first portion 160A forms a portion of a circle having a radius 163A.

The second portion 180A includes lobes 190A. As illustrated, the second portion 180A includes two lobes 190A. Each lobe 190A includes a curved, convex surface 192A. In some embodiments, each lobe 190A is elliptical, with a major axis 197A, and with a minor axis 198A perpendicular to the major axis 197A. In some of such embodiments, each lobe 190A extends away from the first portion 160A along the major axis 197A. As illustrated, in some embodiments, each lobe 190A forms a portion of a circle. As illustrated, a radius 193 of each lobe 190A is less than the radius 163A of the first portion 160A. In some embodiments, the radius 193 of each lobe 190A is greater than the radius 163A of the first portion 160A. In some embodiments, the radius 193 of each lobe 190A is equal to the radius 163A of the first portion 160A.

Each lobe 190A includes a tip 194A. As illustrated, each tip 194A is rounded. In some embodiments, each tip 194A defines an acute angle (when viewed in the coronal plane). In some embodiments, each tip 194A is flat (when viewed in the coronal plane). As illustrated, a radius 195A of the tip 194A is equal to the radius 193 of the lobe 190A. As illustrated, the radius 195A of the tip 194A is less than the radius 163A of the first portion 160A. In some embodiments, the radius 195A of the tip 194A is greater than the radius 163A of the first portion 160A. In some embodiments, the radius 195A of the tip 194A is equal to the radius 163A of the first portion 160A.

A maximum width 164A of the first portion 160A in the coronal plane is measured perpendicular to the center axis 155A. As illustrated, a thickness 196A of each lobe 190A measured along the minor axis 198A is less than the maximum width 164A of the first portion 160A. In some embodiments, the thickness 196A of each lobe 190A is greater than the maximum width 164A of the first portion 160A. In some embodiments, the thickness 196A of each lobe 190A is equal to the maximum width 164A of the first portion 160A.

A maximum width 184A of the second portion 180A in the coronal plane is measured perpendicular to the center axis 155A. As illustrated, the maximum width 184A of the second portion 180A is greater than the maximum width 164A of the first portion 160A. In some embodiments, the maximum width 184A of the second portion 180A is less than the maximum width 164A of the first portion 160A. In some embodiments, the maximum width 184A of the second portion 180A is equal to the maximum width 164A of the first portion 160A.

Each lobe 190A adjoins the first portion 160A with a concave surface 176A. As illustrated, a radius 177A of the concave surface 176A is less than the radius 195A of the tip 194A. In some embodiments, the radius 177A of the concave surface 176A is greater than the radius 195A of the tip 194A. In some embodiments, the radius 177A of the concave surface 176A is equal to the radius 195A of the tip 194A.

As illustrated, a concave surface 182A of the second portion 180A extends between and adjoins the lobes 190A. In some embodiments, the concave surface 182A may be replaced by a flat surface. In some embodiments, the concave surface 182A may be replaced by a curved, convex surface. As illustrated, a radius 183A of the concave surface 182A is greater than the radius 163A of the first portion 160A. In some embodiments, the radius 183A of the concave surface 182A is less than the radius 163A of the first portion 160A. In some embodiments, the radius 183A of the concave surface 182A is equal to the radius 163A of the first portion 160A.

A maximum height 165A of the first portion 160A up to the concave surfaces 176A and a maximum height 185A of the second portion 180A from the concave surfaces 176A are measured in the coronal plane parallel to the center axis 155A. As illustrated, the maximum height 165A of the first portion 160A is greater than the maximum height 185A of the second portion 180A. In some embodiments, the maximum height 165A of the first portion 160A is less than the maximum height 185A of the second portion 180A. In some embodiments, the maximum height 165A of the first portion 160A is equal to the maximum height 185A of the second portion 180A.

Figure 3B:
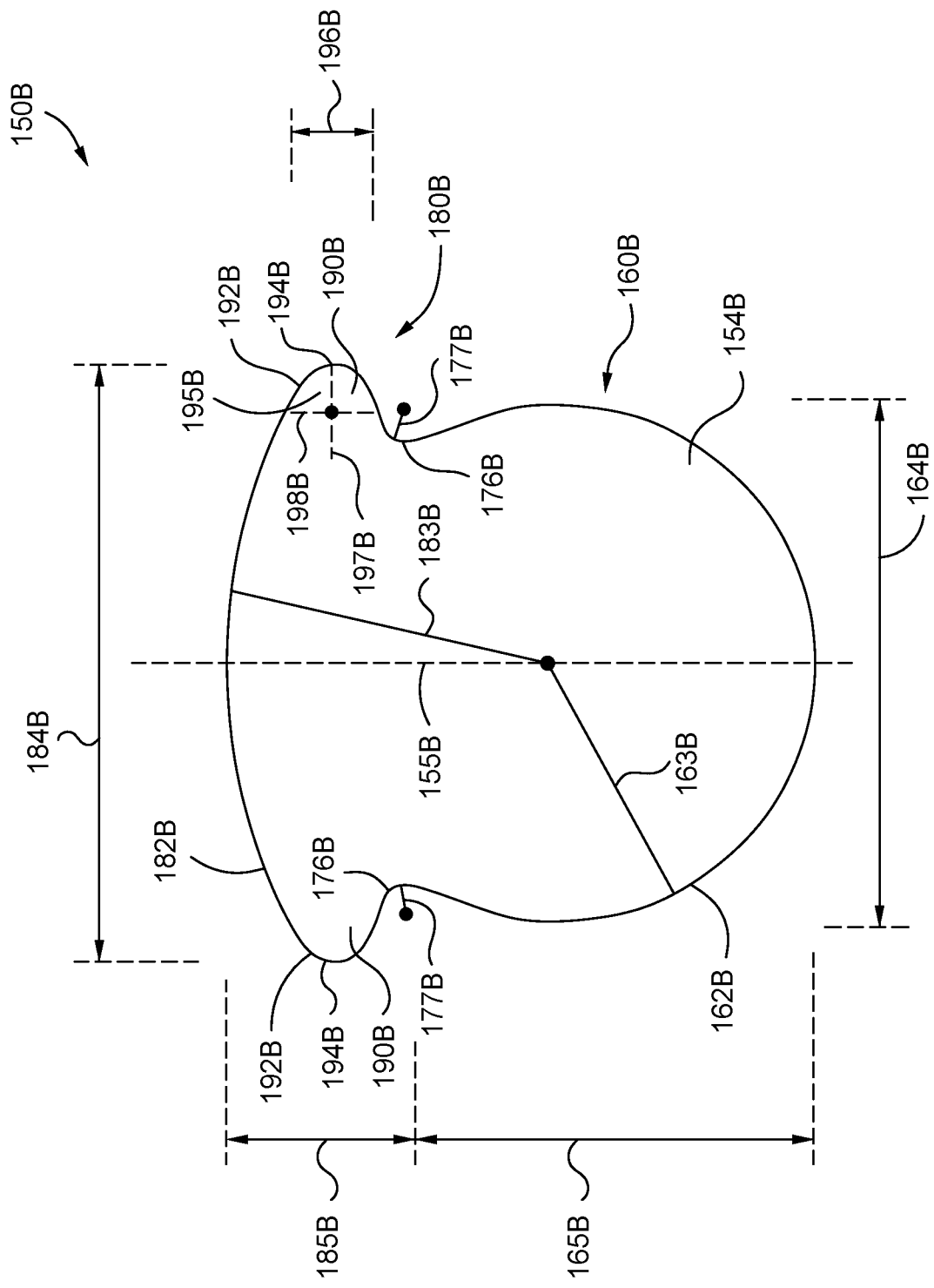

FIG. 3B illustrates sealing member 150B. The sealing member 150B includes a body 154B with a first portion 160B adjoining a second portion 180B. In some embodiments, the sealing member 150B is symmetrical about a center axis 155B passing through the first portion 160B and the second portion 180B. The first portion 160B includes a curved, convex surface 162B. As illustrated, in some embodiments, the convex surface 162B of the first portion 160B forms a portion of a circle having a radius 163B.

The second portion 180B includes lobes 190B. As illustrated, the second portion 180B includes two lobes 190B. Each lobe 190B includes a curved, convex surface 192B. In some embodiments, each lobe 190B forms a portion of a circle. As illustrated, in some embodiments, each lobe 190B is elliptical, with a major axis 197B, and with a minor axis 198B perpendicular to the major axis 197B. Each lobe 190B extends away from the first portion 160B along the major axis 197B.

Each lobe 190B includes a tip 194B. As illustrated, each tip 194B is rounded. In some embodiments, each tip 194B defines an acute angle (when viewed in the coronal plane). In some embodiments, each tip 194B is flat (when viewed in the coronal plane). As illustrated, the radius 195B of the tip 194B is less than the radius 163B of the first portion 160B. In some embodiments, the radius 195B of the tip 194B is greater than the radius 163B of the first portion 160B. In some embodiments, the radius 195B of the tip 194B is equal to the radius 163B of the first portion 160B.

A maximum width 164B of the first portion 160B in the coronal plane is measured perpendicular to the center axis 155B. As illustrated, a thickness 196B of each lobe 190B measured along the minor axis 198B is less than the maximum width 164B of the first portion 160B. In some embodiments, the thickness 196B of each lobe 190B is greater than the maximum width 164B of the first portion 160B. In some embodiments, the thickness 196B of each lobe 190B is equal to the maximum width 164B of the first portion 160B.

A maximum width 184B of the second portion 180B in the coronal plane is measured perpendicular to the center axis 155B. As illustrated, the maximum width 184B of the second portion 180B is greater than the maximum width 164B of the first portion 160B. In some embodiments, the maximum width 184B of the second portion 180B is less than the maximum width 164B of the first portion 160B. In some embodiments, the maximum width 184B of the second portion 180B is equal to the maximum width 164B of the first portion 160B.

Each lobe 190B adjoins the first portion 160B with a concave surface 176B. As illustrated, a radius 177B of the concave surface 176B is equal to the radius 195B of the tip 194B. In some embodiments, the radius 177B of the concave surface 176B is greater than the radius 195B of the tip 194B. In some embodiments, the radius 177B of the concave surface 176B is less than the radius 195B of the tip 194B.

As illustrated, a curved, convex surface 182B of the second portion 180B extends between and adjoins the lobes 190B. Moreover, the convex surface 182B of the second portion 180B extends between and adjoins the tips 194B of the lobes 190B. In some embodiments, the convex surface 182B may be replaced by a flat surface. In some embodiments, the convex surface 182B may be replaced by a concave surface, such as the concave surface 182A. As illustrated, a radius 183B of the convex surface 182B is greater than the radius 163B of the first portion 160B. In some embodiments, the radius 183B of the convex surface 182B is less than the radius 163B of the first portion 160B. In some embodiments, the radius 183B of the convex surface 182B is equal to the radius 163B of the first portion 160B.

A maximum height 165B of the first portion 160B up to the concave surfaces 176B and a maximum height 185B of the second portion 180B from the concave surfaces 176B are measured in the coronal plane parallel to the center axis 155B. As illustrated, the maximum height 165B of the first portion 160B is greater than the maximum height 185B of the second portion 180B. In some embodiments, the maximum height 165B of the first portion 160B is less than the maximum height 185B of the second portion 180B. In some embodiments, the maximum height 165B of the first portion 160B is equal to the maximum height 185B of the second portion 180B.

Figure 3C:
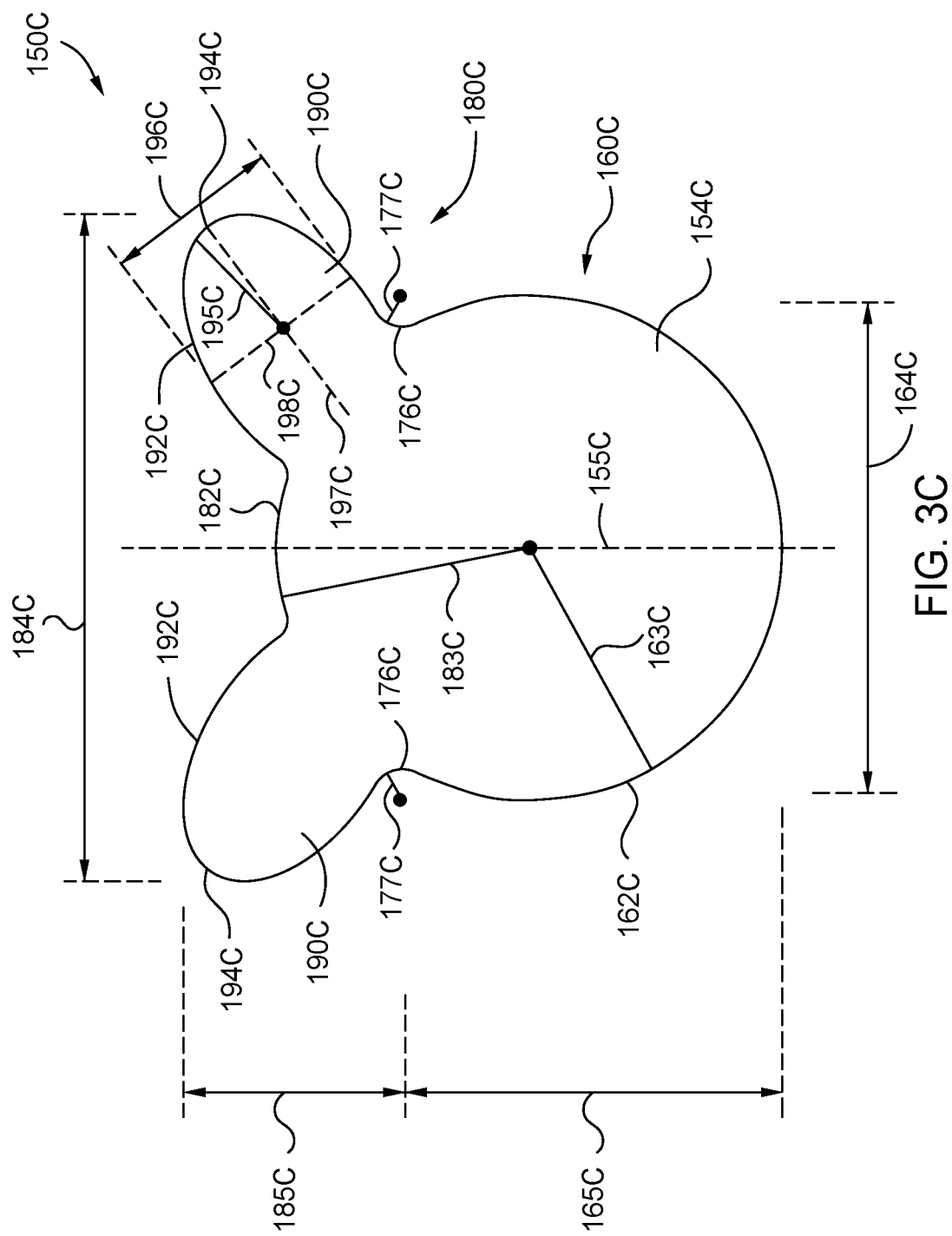

FIG. 3C illustrates sealing member 150C. The sealing member 150C includes a body 154C with a first portion 160C adjoining a second portion 180C. In some embodiments, the sealing member 150C is symmetrical about a center axis 155C passing through the first portion 160C and the second portion 180C. The first portion 160C includes a curved, convex surface 162C. As illustrated, in some embodiments, the convex surface 162C of the first portion 160C forms a portion of a circle having a radius 163C.

The second portion 180C includes lobes 190C. As illustrated, the second portion 180C includes two lobes 190C. Each lobe 190C includes a curved, convex surface 192C. In some embodiments, each lobe 190C forms a portion of a circle. As illustrated, in some embodiments, each lobe 190C is elliptical, with a major axis 197C, and with a minor axis 198C perpendicular to the major axis 197C. Each lobe 190C extends away from the first portion 160C along the major axis 197C.

Each lobe 190C includes a tip 194C. As illustrated, each tip 194C is rounded. In some embodiments, each tip 194C defines an acute angle (when viewed in the coronal plane). In some embodiments, each tip 194C is flat (when viewed in the coronal plane). As illustrated, the radius 195C of the tip 194C is less than the radius 163C of the first portion 160C. In some embodiments, the radius 195C of the tip 194C is greater than the radius 163C of the first portion 160C. In some embodiments, the radius 195C of the tip 194C is equal to the radius 163C of the first portion 160C.

A maximum width 164C of the first portion 160C in the coronal plane is measured perpendicular to the center axis 155C. As illustrated, a thickness 196C of each lobe 190C measured along the minor axis 198C is less than the maximum width 164C of the first portion 160C. In some embodiments, the thickness 196C of each lobe 190C is greater than the maximum width 164C of the first portion 160C. In some embodiments, the thickness 196C of each lobe 190C is equal to the maximum width 164C of the first portion 160C.

A maximum width 184C of the second portion 180C in the coronal plane is measured perpendicular to the center axis 155C. As illustrated, the maximum width 184C of the second portion 180C is greater than the maximum width 164C of the first portion 160C. In some embodiments, the maximum width 184C of the second portion 180C is less than the maximum width 164C of the first portion 160C. In some embodiments, the maximum width 184C of the second portion 180C is equal to the maximum width 164C of the first portion 160C.

Each lobe 190C adjoins the first portion 160C with a concave surface 176C. As illustrated, a radius 177C of the concave surface 176C is less than the radius 195C of the tip 194C. In some embodiments, the radius 177C of the concave surface 176C is greater than the radius 195C of the tip 194C. In some embodiments, the radius 177C of the concave surface 176C is equal to the radius 195C of the tip 194C.

As illustrated, a curved, convex surface 182C of the second portion 180C extends between and adjoins the lobes 190C. In some embodiments, the convex surface 182C may be replaced by a flat surface. In some embodiments, the convex surface 182C may be replaced by a concave surface, such as concave surface 182A. As illustrated, a radius 183C of the convex surface 182C is equal to the radius 163C of the first portion 160C. In some embodiments, the radius 183C of the convex surface 182C is less than the radius 163C of the first portion 160C. In some embodiments, the radius 183C of the convex surface 182C is greater than the radius 163C of the first portion 160C.

A maximum height 165C of the first portion 160C up to the concave surfaces 176C and a maximum height 185C of the second portion 180C from the concave surfaces 176C are measured in the coronal plane parallel to the center axis 155C. As illustrated, the maximum height 165C of the first portion 160C is greater than the maximum height 185C of the second portion 180C. In some embodiments, the maximum height 165C of the first portion 160C is less than the maximum height 185C of the second portion 180C. In some embodiments, the maximum height 165C of the first portion 160C is equal to the maximum height 185C of the second portion 180C.

Figure 3D:
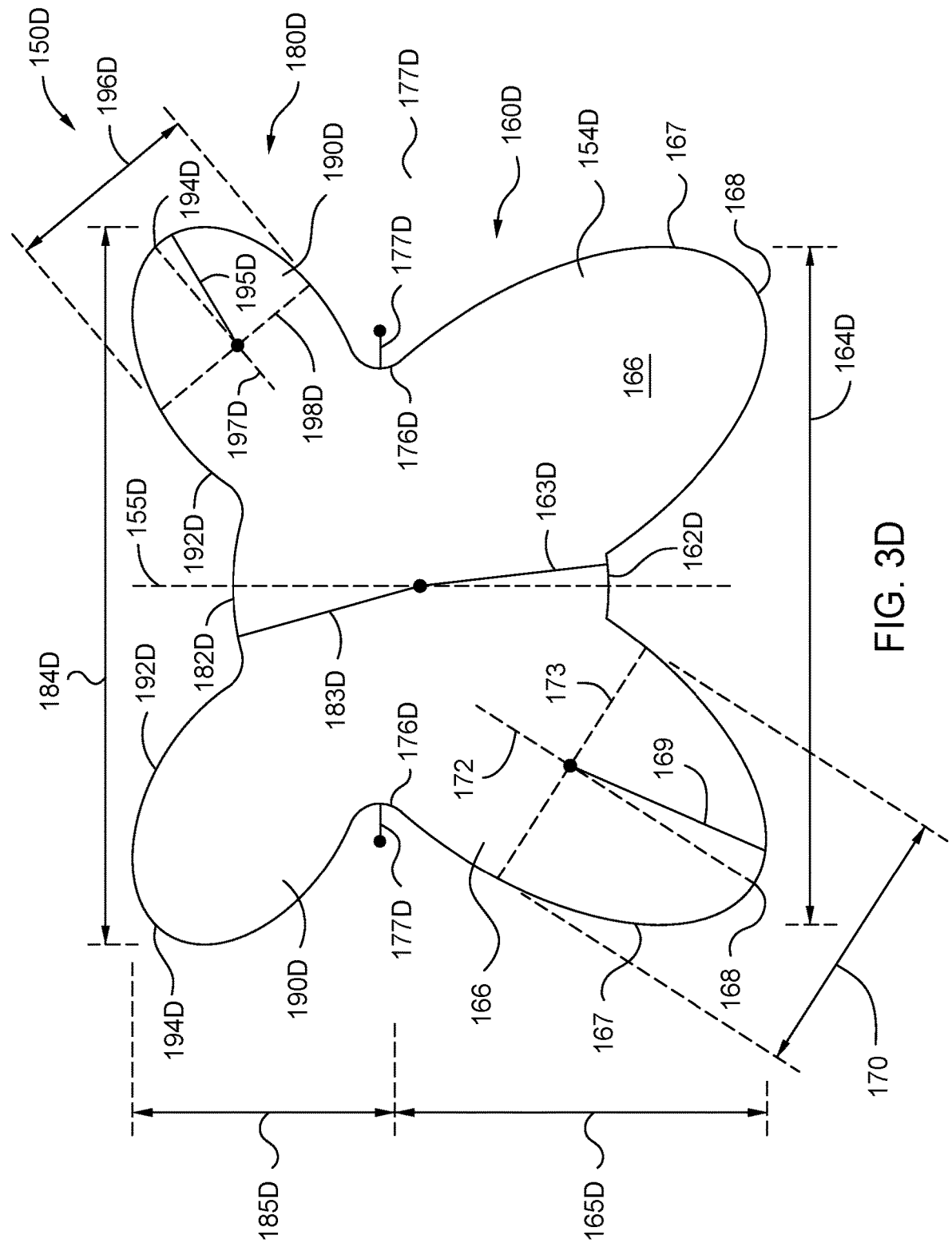

FIG. 3D illustrates sealing member 150D. The sealing member 150D includes a body 154D with a first portion 160D adjoining a second portion 180D. In some embodiments, the sealing member 150D is symmetrical about a center axis 155D passing through the first portion 160D and the second portion 180D.

The first portion 160D includes nodes 166. As illustrated, the first portion 160D includes two nodes 166. Each node 166 includes a curved, convex surface 167. In some embodiments, each node 166 forms a portion of a circle. As illustrated, in some embodiments, each node 166 is elliptical, with a major axis 172, and with a minor axis 173 perpendicular to the major axis 172. Each node 166 extends away from the second portion 180D along the major axis 172. In some embodiments, each node 166 may not be elliptical in shape. Each node 166 includes a tip 168. As illustrated, each tip 168 is rounded. In some embodiments, each tip 168 defines an acute angle (when viewed in the coronal plane). In some embodiments, each tip 168 is flat (when viewed in the coronal plane).

As illustrated, a curved, convex surface 162D of the first portion 160D extends between and adjoins the nodes 166. As illustrated, in some embodiments, the convex surface 162D forms a portion of a circle having a radius 163D. In some embodiments, the convex surface 162D may be replaced by a flat surface. In some embodiments, the convex surface 162D may be replaced by a concave surface.

The second portion 180D includes lobes 190D. As illustrated, the second portion 180D includes two lobes 190D. Each lobe 190D includes a curved, convex surface 192D. In some embodiments, each lobe 190D forms a portion of a circle. As illustrated, in some embodiments, each lobe 190D is elliptical, with a major axis 197D, and with a minor axis 198D perpendicular to the major axis 197D. Each lobe 190D extends away from the first portion 160D along the major axis 197D.

Each lobe 190D includes a tip 194D. As illustrated, each tip 194D is rounded. In some embodiments, each tip 194D defines an acute angle (when viewed in the coronal plane). In some embodiments, each tip 194D is flat (when viewed in the coronal plane). As illustrated, in each lobe 190D, the radius 195D of the tip 194D is less than a radius 169 of the tip 168 of each node 166. In some embodiments, the radius 195D of the tip 194D is greater than the radius 169 of the tip 168 of each node 166. In some embodiments, the radius 195D of the tip 194D is equal to the radius 169 of the tip 168 of each node 166.

A maximum width 164D of the first portion 160D in the coronal plane is measured perpendicular to the center axis 155D. As illustrated, a thickness 196D of each lobe 190D measured along the minor axis 198D is less than the maximum width 164D of the first portion 160D. In some embodiments, the thickness 196D of each lobe 190D is greater than the maximum width 164D of the first portion 160D. In some embodiments, the thickness 196D of each lobe 190D is equal to the maximum width 164D of the first portion 160D.

As illustrated, the thickness 196D of each lobe 190D is less than a thickness 170 of each node 166 measured along the minor axis 173. In some embodiments, the thickness 196D of each lobe 190D is greater than the thickness 170 of each node 166. In some embodiments, the thickness 196D of each lobe 190D is equal to the thickness 170 of each node 166.

A maximum width 184D of the second portion 180D in the coronal plane is measured perpendicular to the center axis 155D. As illustrated, the maximum width 184D of the second portion 180D is greater than the maximum width 164D of the first portion 160D. In some embodiments, the maximum width 184D of the second portion 180D is less than the maximum width 164D of the first portion 160D. In some embodiments, the maximum width 184D of the second portion 180D is equal to the maximum width 164D of the first portion 160D.

Each lobe 190D adjoins the first portion 160D with a concave surface 176D. As illustrated, a radius 177D of the concave surface 176D is less than the radius 195D of the tip 194D. In some embodiments, the radius 177D of the concave surface 176D is greater than the radius 195D of the tip 194D. In some embodiments, the radius 177D of the concave surface 176D is equal to the radius 195D of the tip 194D.

As illustrated, a curved, convex surface 182D of the second portion 180D extends between and adjoins the lobes 190D. As illustrated, in some embodiments, the convex surface 182D forms a portion of a circle having a radius 183D. As illustrated, in some embodiments, the radius 183D of the convex surface 182D is equal to the radius 163D of the convex surface 162D. In some embodiments, the radius 183D of the convex surface 182D is greater than the radius 163D of the convex surface 162D. In some embodiments, the radius 183D of the convex surface 182D is less than the radius 163D of the convex surface 162D. In some embodiments, the convex surface 182D may be replaced by a flat surface. In some embodiments, the convex surface 182D may be replaced by a concave surface, such as concave surface 182A.

A maximum height 165D of the first portion 160D up to the concave surfaces 176D and a maximum height 185D of the second portion 180D from the concave surfaces 176D are measured in the coronal plane parallel to the center axis 155D. As illustrated, the maximum height 165D of the first portion 160D is greater than the maximum height 185D of the second portion 180D. In some embodiments, the maximum height 165D of the first portion 160D is less than the maximum height 185D of the second portion 180D. In some embodiments, the maximum height 165D of the first portion 160D is equal to the maximum height 185D of the second portion 180D.

FIGS. 4A-4D schematically illustrate the sealing members 150A-150D, respectively, installed in the assembly of the first component 100 mounted to the second component 120. The Figures depict, in the coronal plane, the portion of the assembled first and second components 100, 120 as shown in FIG. 2A.

In FIG. 4A, the sealing member 150 is represented by the sealing member 150A. The first portion 160A of the sealing member 150A is installed in the seal groove 110, and makes sealing contact with the sidewalls 112 and the floor 114 of the seal groove 110. The second portion 180A of the sealing member 150A protrudes out of the opening 116 of the seal groove 110. The lobes 190A protrude between the second component 120 and the face 102 of the first component 100. In some embodiments, the lobes 190A make sealing contact with the face 102 of the first component 100. In an example, each lobe 190A provides a lip seal against the face 102 of the first component 100.

In some embodiments, each concave surface 176A adjoining each lobe 190A and the first portion 160A makes sealing contact with a corresponding edge 104 of the face 102 of the first component 100 at the opening 116 of the seal groove 110. In some embodiments, each edge 104 is rounded. As illustrated, in some of such embodiments, a radius 106 of each edge 104 is equal to the radius 177A of the corresponding concave surface 176A. In some embodiments, the radius 106 of each edge 104 is greater than the radius 177A of the corresponding concave surface 176A. In some embodiments, the radius 106 of each edge 104 is less than the radius 177A of the corresponding concave surface 176A.

The ridge 122 is shown aligned with the seal groove 110. The end 126 of the ridge 122 makes sealing contact with the second portion 180A of the sealing member 150A. As illustrated, in some embodiments, the end 126 of the ridge 122 makes sealing contact with the surface 182A between the lobes 190A. In some embodiments, the end 126 of the ridge 122 does not make sealing contact with the surface 182A between the lobes 190A. As illustrated, in some embodiments, the end 126 of the ridge 122 makes sealing contact with both lobes 190A. In an example, each lobe 190A provides a lip seal against the end 126 of the ridge 122. In some embodiments, the end 126 of the ridge 122 makes sealing contact with only one lobe 190A. In some embodiments, the end 126 of the ridge 122 does not make sealing contact with either lobe 190A.

In FIG. 4B, the sealing member 150 is represented by the sealing member 150B. The first portion 160B of the sealing member 150B is installed in the seal groove 110, and makes sealing contact with the sidewalls 112 and the floor 114 of the seal groove 110. The second portion 180B of the sealing member 150B protrudes out of the opening 116 of the seal groove 110. The lobes 190B protrude between the second component 120 and the face 102 of the first component 100. In some embodiments, the lobes 190B make sealing contact with the face 102 of the first component 100. In an example, each lobe 190B provides a lip seal against the face 102 of the first component 100.

In some embodiments, each concave surface 176B adjoining each lobe 190B and the first portion 160B makes sealing contact with a corresponding edge 104 of the face 102 of the first component 100 at the opening 116 of the seal groove 110. As described above, in some embodiments, each edge 104 is rounded. As illustrated, in some of such embodiments, the radius 106 of each edge 104 is equal to the radius 177B of the corresponding concave surface 176B. In some embodiments, the radius 106 of each edge 104 is greater than the radius 177B of the corresponding concave surface 176B. In some embodiments, the radius 106 of each edge 104 is less than the radius 177B of the corresponding concave surface 176B.

The ridge 122 is shown aligned with the seal groove 110. The end 126 of the ridge 122 makes sealing contact with the second portion 180B of the sealing member 150B. As illustrated, in some embodiments, the end 126 of the ridge 122 makes sealing contact with the surface 182B between the lobes 190B. In some embodiments, the end 126 of the ridge 122 does not make sealing contact with the surface 182B between the lobes 190B. As illustrated, in some embodiments, the end 126 of the ridge 122 makes sealing contact with both lobes 190B. In an example, each lobe 190B provides a lip seal against the end 126 of the ridge 122. In some embodiments, the end 126 of the ridge 122 makes sealing contact with only one lobe 190B. In some embodiments, the end 126 of the ridge 122 does not make sealing contact with either lobe 190B.

In FIG. 4C, the sealing member 150 is represented by the sealing member 150C. The first portion 160C of the sealing member 150C is installed in the seal groove 110, and makes sealing contact with the sidewalls 112 and the floor 114 of the seal groove 110. The second portion 180C of the sealing member 150C protrudes out of the opening 116 of the seal groove 110. The lobes 190C protrude between the second component 120 and the face 102 of the first component 100. In some embodiments, the lobes 190C make sealing contact with the face 102 of the first component 100. In an example, each lobe 190C provides a lip seal against the face 102 of the first component 100.

In some embodiments, each concave surface 176C adjoining each lobe 190C and the first portion 160C makes sealing contact with a corresponding edge 104 of the face 102 of the first component 100 at the opening 116 of the seal groove 110. As described above, in some embodiments, each edge 104 is rounded. In some of such embodiments, the radius 106 of each edge 104 is equal to the radius 177C of the corresponding concave surface 176C. In some embodiments, the radius 106 of each edge 104 is greater than the radius 177C of the corresponding concave surface 176C. In some embodiments, the radius 106 of each edge 104 is less than the radius 177C of the corresponding concave surface 176C.

The ridge 122 is shown aligned with the seal groove 110. The end 126 of the ridge 122 makes sealing contact with the second portion 180C of the sealing member 150C. As illustrated, in some embodiments, the end 126 of the ridge 122 makes sealing contact with the surface 182C between the lobes 190C. In some embodiments, the end 126 of the ridge 122 does not make sealing contact with the surface 182C between the lobes 190C. As illustrated, in some embodiments, the end 126 of the ridge 122 makes sealing contact with both lobes 190C. In an example, each lobe 190C provides a lip seal against the end 126 of the ridge 122. In some embodiments, the end 126 of the ridge 122 makes sealing contact with only one lobe 190C. In some embodiments, the end 126 of the ridge 122 does not make sealing contact with either lobe 190C.

In FIG. 4D, the sealing member 150 is represented by the sealing member 150D, and the seal groove 110 is represented by seal groove 110'. Seal groove 110' is configured the same as seal groove 110, except that the floor 114 includes a raised crest 113 between two recesses 115. It is contemplated that the raised crest 113 and the recesses 115 extend along the length of the seal groove 110'. The first portion 160D of the sealing member 150D is installed in the seal groove 110', and makes sealing contact with the sidewalls 112 and the floor 114 of the seal groove 110'. Each node 166 of the first portion 160D sits in a corresponding recess 115. As illustrated, in some embodiments, each node 166 makes sealing contact with a corresponding sidewall 112 of the seal groove 110'.

The second portion 180D of the sealing member 150D protrudes out of the opening 116 of the seal groove 110'. The lobes 190D protrude between the second component 120 and the face 102 of the first component 100. In some embodiments, the lobes 190D make sealing contact with the face 102 of the first component 100. In an example, each lobe 190D provides a lip seal against the face 102 of the first component 100.

In some embodiments, each concave surface 176D adjoining each lobe 190D and the first portion 160D makes sealing contact with a corresponding edge 104 of the face 102 of the first component 100 at the opening 116 of the seal groove 110'. As described above, in some embodiments, each edge 104 is rounded. In some of such embodiments, the radius 106 of each edge 104 is equal to the radius 177D of the corresponding concave surface 176D. In some embodiments, the radius 106 of each edge 104 is greater than the radius 177D of the corresponding concave surface 176D. In some embodiments, the radius 106 of each edge 104 is less than the radius 177D of the corresponding concave surface 176D.

The ridge 122 is shown aligned with the seal groove 110. The end 126 of the ridge 122 makes sealing contact with the second portion 180D of the sealing member 150D. As illustrated, in some embodiments, the end 126 of the ridge 122 makes sealing contact with the surface 182D between the lobes 190D. In some embodiments, the end 126 of the ridge 122 does not make sealing contact with the surface 182D between the lobes 190D. As illustrated, in some embodiments, the end 126 of the ridge 122 makes sealing contact with both lobes 190D. In an example, each lobe 190D provides a lip seal against the end 126 of the ridge 122.

In some embodiments, the end 126 of the ridge 122 makes sealing contact with only one lobe 190D. In some embodiments, the end 126 of the ridge 122 does not make sealing contact with either lobe 190D.

It is contemplated that the configurations of each sealing member 150A-150D promotes the establishment of sealing contact between the ridge 122 and the respective sealing member 150A-150D, and between the respective sealing member 150A-150D and the first component 100. It is contemplated that sealing contact between the ridge 122 and the respective sealing member 150A-150D, and between the respective sealing member 150A-150D and the first component 100 may be established even if the ridge 122 is in a displaced position, such as illustrated in FIG. 2B. It is contemplated that sealing contact between the ridge 122 and the respective sealing member 150A-150D, and between the respective sealing member 150A-150D and the first component 100 may be established even if the seal groove 110, 110' in the first component 100 becomes enlarged due to corrosion and/or erosion.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

What is claimed is:

1. A sealing member, comprising:
   an elongated monolithic body including a first portion adjoining a second portion;
   wherein, when viewed in a coronal plane perpendicular to a direction of elongation:
      the first portion forms more than half of a circle having a first radius that extends from a first concave surface to a second concave surface; and
      the second portion comprises:
         a first lobe including a first rounded tip, and adjoining the first concave surface;
         a second lobe including a second rounded tip, and adjoining the second concave surface; and
         a convex surface having a second radius greater than the first radius, and extending from the first rounded tip to the second rounded tip.

2. The sealing member of claim 1, wherein the first and second portions are symmetrical in the coronal plane about a center axis passing through the first and second portions.

3. The sealing member of claim 1, wherein when viewed in the coronal plane, a width of the second portion from the first rounded tip to the second rounded tip is greater than a maximum width of the first portion.

4. The sealing member of claim 1, wherein the monolithic body is made of an elastic plasma-resistant material.

5. A sealing member, comprising:
   an elongated monolithic body including a first portion adjoining a second portion;
   wherein, when viewed in a coronal plane perpendicular to a direction of elongation:
      the first portion includes first and second elliptical nodes;
      each node includes a first major axis and a first minor axis, and extends away from the second portion along the first major axis;
      the second portion includes first and second elliptical lobes;
      each lobe includes a second major axis and a second minor axis, and extends away from the first portion along the second major axis;
      a thickness of each node measured along the first minor axis is greater than a thickness of each lobe measured along the second minor axis; and
      the second portion further comprises a convex surface extending between the first and second lobes.

6. The sealing member of claim 5, wherein the first and second portions are symmetrical in the coronal plane about a center axis passing through the first and second portions.

7. The sealing member of claim 6, wherein a maximum width of the second portion measured perpendicular to the center axis is greater than a maximum width of the first portion measured perpendicular to the center axis.

8. An assembly comprising:
   a first component including a face with a seal groove therein;
   a sealing member in the seal groove; and
   a second component mounted to the first component, and including a ridge;
   wherein:
      the seal groove includes an opening with a first width;
      the ridge includes an end with a second width less than the first width; and
      the sealing member comprises:
         a monolithic body elongated in a direction along the seal groove, and including:
            a first portion located in the seal groove; and
            an adjoining second portion protruding out of the seal groove opening and contacting the end of the ridge;
         the second portion including first and second lobes, each lobe contacting the face of the first component at the opening of the seal groove; and
         the end of the ridge contacts a convex surface of the second portion that adjoins the first lobe and the second lobe.

9. The assembly of claim 8, wherein the first and second portions are symmetrical in a coronal plane about a center axis passing through the first and second portions.

10. The assembly of claim 8, wherein each lobe contacts the end of the ridge of the second component.

11. The assembly of claim 8, wherein the convex surface extends from a rounded tip of the first lobe to a rounded tip of the second lobe.

12. The assembly of claim 11, wherein a radius of the first portion is less than a radius of the convex surface.

13. The assembly of claim 8, wherein the seal groove further includes a base extending between first and second sidewalls, the base including first and second recesses separated by a raised crest, the first and second recesses extending along the seal groove.

14. The assembly of claim 13, wherein the first portion of the seal member body further includes first and second nodes, the first node extending into the first recess, and the second node extending into the second recess.

15. The assembly of claim 14, wherein the first node seals against the first sidewall, and the second node seals against the second sidewall.

16. The assembly of claim 14, wherein when viewed in a coronal plane perpendicular to the direction along the seal groove, a thickness of the first node and a thickness of the second node are greater than a thickness of the first lobe and a thickness of the second lobe.

* * * * *